Figure 1A:
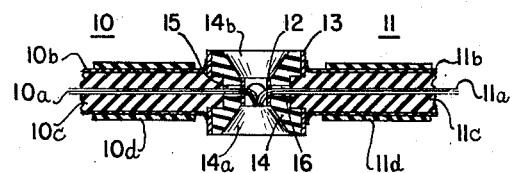

Jan. 20, 1948.     E. G. HILLS     2,434,742

ELECTRICAL CONNECTOR FOR COAXIAL CABLES

Filed April 27, 1944

INVENTOR
ELMER G. HILLS

Mueller, Dodds & Mason

ATTORNEYS

Patented Jan. 20, 1948

2,434,742

UNITED STATES PATENT OFFICE 2,434,742

ELECTRICAL CONNECTOR FOR COAXIAL CABLES

Elmer G. Hills, Chicago, Ill., assignor, by mesne assignments, to Belmont Radio Corporation, Chicago, Ill., a corporation of Illinois Application April 27, 1944, Serial No. 532,947

8 Claims. (Cl. 174—88)

This invention relates to electrical connectors for joining a plurality of cables or conductors and, while it is of general application, it is particularly suitable for joining a plurality of coaxial cables.

Electrical connectors heretofore proposed for joining a plurality of coaxial cables have comprised a complicated mechanical assembly of a considerable number of individual elements, resulting in a structure which is not only expensive and requires a considerable number of manufacturing operations, but also places a definite limit on the number of cables that can be connected at a single junction. In addition such connectors have usually required the use of complementary cable fittings attached to the cables for connection to the device. On the other hand there is a demand for a coaxial cable connector comprising a simple unitary structure requiring no additional cable fittings.

It is an object of the invention, therefore, to provide a simple and inexpensive electrical connector for joining a plurality of conductors which avoids one or more of the foregoing limitations and disadvantages of the prior art arrangements.

It is another object of the invention to provide an improved electrical connector comprising a simple unitary structure requiring no additional cable fittings.

It is another object of the invention to provide an improved electrical connector for joining a plurality of coaxial cables in which there is substantially no limit on the number of cables which can be connected at a single junction.

In accordance with the invention, a connector for joining a plurality of coaxial cables each including inner and outer conductors separated by insulation comprises inner and outer elongated hollow conductive members, such as coaxial cylindrical members, and insulation means, such as a mass of moulded dielectric material, supporting the inner member from the outer member to form a unitary structure. The structure is preferably formed with conical recesses in each end registering with the inner conductive member which is of a shorter length than the outer conductive member. The structure is also formed with a plurality of bores extending through both members, one bore for each of the cables to be joined. Each of the bores at the inner member is of a size to receive only the inner conductor of its associated cable and is of a size at the outer member to receive the inner conductor and at least a portion, preferably all, of its surrounding insulation. The structure includes provisions for electrically connecting the outer conductor of each associated cable to the outer member and the inner conductor thereof to the inner member.

The provisions included for electrically connecting the inner and outer conductors of each cable with the corresponding inner and outer members of the connector will depend upon the nature of the joint, that is, whether it is designed to be a permanent or disconnectable joint, and further upon the type of cable. If the joint is to be permanent, the provisions may comprise merely a tinning or other suitable treatment of the surfaces of the connector members to facilitate electrical bonding, as by soldering. If the cable is to be of the disconnectable type, these provisions may include suitable frictional engaging or clamping means for the inner and outer conductors as described hereinafter. The terms cylindrical as applied to the connector members and conical as applied to the recesses in the connector are used herein in their generic sense to include cylindrical and conical surfaces of various shapes and are not to be limited to circular cylindrical and circular conical surfaces respectively. Furthermore, the term "substantially cylindrical" as used herein and in the appended claims is intended to refer to configurations generally equivalent to true cylindrical surfaces, for example, spherical segments and the like.

In a preferred embodiment of the invention the connector structure described includes also a pair of opposed hats having a configuration closely conforming to the connector and the cables when joined at the connector.

For a better understanding of the invention, together with other and further objects thereof, reference is had to the following description taken in connection with the accompanying drawings, while its scope will be pointed out in the appended claims.

Figure 1B:
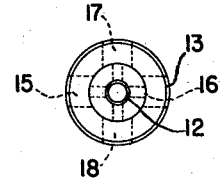
Figure 2:
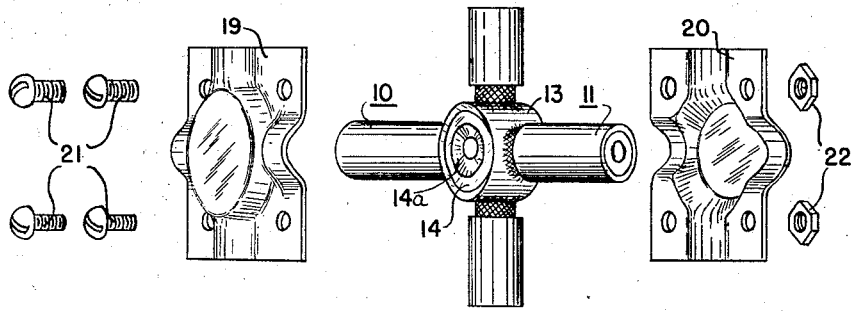
Figure 3:
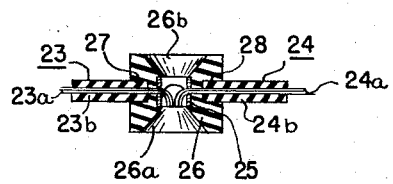

Referring now to the drawings, there are shown in Figs. 1a, 1b a longitudinal sectional view and an end view, respectively, of the connector of the invention, a pair of coaxial cables being shown connected in Fig. 1a, while Fig. 2 comprises an exploded perspective view of the completed unit with the cables connected and the associated hats and Fig. 3 is a longitudinal sectional view of an alternative structure for connecting a plurality of single-conductor cables.

Referring now to Figs. 1a, 1b of the drawings there is represented the connector of the invention for joining a pair of coaxial cables 10, 11. The cable 10 includes an inner conductor 10a and an outer conductor 10b separated by insulation 10c and usually surrounded with an outer layer of insulation 10d. The coaxial cable 11 is similarly constructed and several elements are similarly identified with numerals having corresponding subscripts. The connector comprises an inner elongated hollow conductive member, such as a cylindrical brass member 12, and a coaxial outer elongated hollow conductive member such as a cylindrical brass member 13, the inner member 12 being supported from the outer member 13 by insulation means, such as a mass 14 of molded dielectric material, to form a unitary structure. The inner member has a length preferably of the order of one-fourth that of the outer member while the molded dielectric material is formed with a conical recess at each end preferably of a diameter of the order of one-half that of the outer member 13 and of a depth of the order of one-third of the length of the outer member in order that the inner end of the conical recess registers with the inner member 12. However, for any given dielectric material and any given cable characteristic impedance, the dimensions are preferably determined to give to the connector an impedance substantially matching the characteristic cable impedance, but this is relatively unimportant if the length of the connector is small in terms of the wave-length being translated.

The structure described is formed with a plurality of radial bores 15, 16, 17, 18 extending through both of the members 12 and 13. Thus the bore 15 is adapted to receive the terminus of the cable 10, the bore 16 is adapted to receive the terminus of the cable 11 and the bores 17 and 18 are adapted to receive other coaxial cables not shown. Each of the bores is tapered or stepped as shown so that the size of the bore at the inner member 12 is such as to receive only the extended inner conductor of its associated cable while at the outer member 13 the size of the bore is such as to receive the inner conductor of the associated cable and at least a portion of, preferably the entire amount of the surrounding insulation.

In manufacturing the connector, the inner member 12 and the outer member 13 are mounted in a suitable jig and placed in a mold. A thermoplastic dielectric is placed in the mold and heat and pressure applied, so that the dielectric material engages or is bonded to the members 12 and 13 to form a unitary structure.

In assembling the connector with a coaxial cable, for example cable 10, the outer conductor 10b of the cable and the insulation surrounding the inner conductor 10a are cut-back, the inner conductor is stripped, and the cable is inserted in the bore 15 of the connector with the tip of the inner conductor extending through the bore in the inner member 12, while at least a portion, or all, of the insulation surrounding the next adjacent portion of the inner conductor 10a is fitted into the outer portion of the bore 15, thus fixing the cable in place and properly insulating the inner conductor from the outer member 13. The inner ends of the several inner conductors are then bent over or crimped as shown in Fig. 1a and soldered together and to the inner member 12 to fix them in place rigidly and to complete an electrical connection between them. The conical recesses 14a, 14b facilitate the soldering operation, permitting the tip of the soldering iron to contact the ends of the conductors. The outer conductor 10b of the cable 10, usually in the form of flexible braid, is spread and laid over the outer member 13 and soldered thereto. To facilitate this soldering, the members 12 and 13 may be tinned or otherwise suitably treated.

Either the soldering arrangement described or equivalent mechanical securing means comprises provisions for electrically connecting the outer conductors of the associated coaxial cables to the outer member of the connector and the inner conductors of the associated cables to the inner member.

In most applications of the connector of the invention, it is preferable also to enclose the cable junction including the connector and for this purpose there may be utilized a pair of opposed hats 19, 20 as illustrated in Fig. 2, these hats being punched or stamped to conform closely to the configuration of the connector and its associated cables when in place. The hats 19 and 20 are disposed to engage opposite sides of the connector assembly and to be fastened together by suitable means such as the bolts 21 and nuts 22. When thus bolted in place, the hats 19 and 20 serve to shield the connector assembly electrostatically, being in conductive engagement with opposite ends of the outer conductor 13, and at the same time they engage the several coaxial cables to enforce their support and to avoid breakage of the connections at the outer member 13, the whole forming a rigid unitary connector assembly.

In certain instances it may be possible to omit the conical recesses 14a, 14b and to make the inner conductor member 12 of the same length as the outer conductor member 13. In certain installations also it may be possible to omit the hats 19 and 20. However, both the conical recesses 14a, 14b and the hats 19 and 20, when in place, affect the capacitance of the connector unit. Hence, if a connector unit is to be designed for use with a coaxial cable of any given characteristic impedance and if these features are omitted, the dimensions of the connector unit are preferably modified appropriately to obtain the desired impedance matching with the associated cable.

Referring to Fig. 3 there is represented a modified construction of connector for joining a plurality of single-conductor cables. The cables 23, 24, comprising single conductors 23a, 24a surrounded by insulation 23b, 24b, respectively, are joined by a connector comprising a single cylindrical conductive member such as a brass cylinder 25 and a surrounding mass of molded dielectric material engaging the member 25 to form a unitary connector structure. The insulation material 26 is formed with conical recesses 26a, 26b at opposite ends registering with the ends of the member 25. The structure thus formed is provided with a plurality of radial bores extending through the insulation 26 and the member 25, each of the bores at the inner member being of a size to receive only the conductor of its associated cable and, at the outer portion of the insulation material, being of a size to receive the conductor and at least a portion, preferably all, of the surrounding insulation of the conductor. As in the arrangement of Figs. 1a and 1b, there are provisions for electrically connecting the conductors of each associated cable to the member 25. To this end, the inner end of the conductors 23a, 24a are bent over or crimped within the inner member 25 and soldered together and to the member 25 to form a rigid unitary structure.

While each of the connectors described has been illustrated for the connection of a plurality of cables having a single inner conductor, it will be apparent that it is also adapted for the connection of coaxial cables of any number of conductors by suitable extension of the principles embodied in the form specifically described.

Thus, in each of the embodiments of the invention described above there is provided a single rigid unitary connector and cable assembly which involves a minimum number of manufacturing and assembling operations. There is also provided a cable connector by means of which any desired number of cables, either of the coaxial or single conductor type, may be connected at a common junction.

While there have been described what are presently considered to be the preferred embodiments of the invention, it will be obvious to those skilled in the art that various changes and modifications may be made thereto without departing from the spirit and scope of the invention.

What is claimed as new is:

1. A connector for joining a plurality of coaxial cables each including inner and outer conductors separated by insulation comprising, an outer hollow conductive member, an inner conductive member in spaced relation to said outer member, insulation means supporting the inner member from the outer member to form a unitary structure, said structure being formed with a plurality of bores extending through both members for said cables, each of said bores at said inner member being of a size to receive only the inner conductor of its associated cable and at said outer member to receive the inner conductor and at least a portion of its surrounding insulation.

2. A connector for joining a plurality of coaxial cables each including inner and outer conductors separated by insulation comprising, inner and outer coaxial substantially cylindrical conductive members, insulation means supporting the inner member from the outer member to form a unitary structure, said structure being formed with a plurality of bores extending through both members for said cables, each of said bores at said inner member being of a size to receive only the inner conductor of its associated cable and at said outer member to receive the inner conductor and at least a portion of its surrounding insulation.

3. A connector for joining a plurality of coaxial cables each including inner and outer conductors separated by insulation comprising, inner and outer coaxial substantially cylindrical members, insulation means supporting the inner member from the outer member to form a unitary structure, said structure being formed with a plurality of bores extending through both members for said cables, each of said bores at said inner member being of a size to receive only the inner conductor of its associated cable and at said outer member to receive the inner conductor and at least a portion of its surrounding insulation, and provisions for electrically connecting the outer conductor of each associated cable to said outer member and the inner conductor thereof to said inner member.

4. A connector for joining a plurality of coaxial cables each including inner and outer conductors separated by insulation comprising, inner and outer coaxial substantially cylindrical conductive members, a mass of molded dielectric material separating and supporting the inner member from the outer member to form a unitary structure, said structure being formed with a plurality of bores extending through both members for said cables, each of said bores at said inner member being of a size to receive only the inner conductor of its associated cable and at said outer member to receive the inner conductor and at least a portion of its surrounding insulation, and provisions for electrically connecting the outer conductor of each associated cable to said outer member and the inner conductor thereof to said inner member.

5. A connector for joining a plurality of coaxial cables each including inner and outer conductors separated by insulation comprising, inner and outer coaxial substantially cylindrical conductive members, insulation means supporting the inner member from the outer member to form a unitary structure, said structure being formed with a plurality of bores extending through both members for said cables, each of said bores at said inner member being of a size to receive only the inner conductor of its associated cable and at said outer member to receive the inner conductor and at least a portion of its surrounding insulation, and said inner and outer members being adapted for electrical bonding to the inner and outer conductors, respectively, of said cables.

6. A connector for joining a plurality of coaxial cables each including inner and outer conductors separated by insulation comprising, inner and outer coaxial substantially cylindrical conductive members, a mass of molded dielectric material separating and supporting the inner member from the outer member to form a unitary structure, said structure being formed with a conical recess in each end and with a plurality of bores extending through both members for said cables, each of said bores at said inner member being of a size to receive only the inner conductor of its associated cable and at said outer member to receive the inner conductor and at least a portion of its surrounding insulation, and provisions for electricaly connecting the outer conductor of each associated cable to said outer member and the inner conductor thereof to said inner member.

7. A connector for joining a plurality of coaxial cables each including inner and outer conductors separated by insulation comprising, inner and outer coaxial substantially cylindrical conductive members, said inner member having a length of the order of one-fourth that of said outer member, a mass of molded dielectric material separating and supporting the inner member from the outer member to form a unitary structure, said structure being formed with a conical recess in each end of a diameter of the order of one-half that of said outer member and of a depth of the order of one-third the length of said outer member and being formed also with a plurality of bores extending through both members for said cables, each of said bores at said inner member being of a size to receive only the inner conductor of its associated cable and at said outer member to receive the inner conductor and at least a portion of its surrounding insulation, and provisions for electrically connecting the outer conductor of each associated cable to said outer member and the inner conductor thereof to said inner member.

8. A connector for joining a plurality of coaxial cables each including inner and outer conductors separated by insulation comprising, inner and outer coaxial substantially cylindrical conductive members, insulation means supporting the inner member from the outer member to form a unitary structure, said structure being formed with a plurality of bores extending through both members for said cables, each of said bores at said inner member being of a size to receive only the inner conductor of its associated cable and at said outer member to receive the inner conductor and at least a portion of its surrounding insulation, provisions for electrically connecting the outer conductor of each associated cable to said outer member and the inner conductor thereof to said inner member, and a pair of opposed hats closely conforming to the configuration of the connector and its associated cables when in place for engaging the same.

ELMER G. HILLS.

REFERENCES CITED

The following references are of record in the file of this patent:

UNITED STATES PATENTS

| Number | Name | Date |
| --- | --- | --- |
| 477,951 | Mezger | June 28, 1892 |
| 990,353 | Gudeman | Apr. 25, 1911 |
| 1,950,616 | Kyle | Mar. 13, 1934 |
| 1,969,529 | Shafer | Aug. 7, 1934 |
| 2,087,384 | Lee | July 20, 1937 |
| 2,260,121 | Miller | Oct. 21, 1941 |

FOREIGN PATENTS

| Number | Country | Date |
| --- | --- | --- |
| 18,926 | Great Britain | 1904 |
| 373,018 | Germany | July 7, 1921 |
| 577,347 | France | 1924 |
| 587,574 | France | Apr. 21, 1925 |